(12) United States Patent
Iwai et al.

(10) Patent No.: US 9,239,535 B2
(45) Date of Patent: Jan. 19, 2016

(54) OPTICAL SCANNING DEVICE AND IMAGE FORMING APPARATUS

(71) Applicant: CANON KABUSHIKI KAISHA, Tokyo (JP)

(72) Inventors: Hitoshi Iwai, Abiko (JP); Keiichi Sato, Kawasaki (JP); Jun Ogata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/336,429

(22) Filed: Jul. 21, 2014

(65) Prior Publication Data
US 2015/0029283 A1    Jan. 29, 2015

(30) Foreign Application Priority Data

Jul. 24, 2013  (JP) .................................. 2013-153558

(51) Int. Cl.
*G03G 15/04* (2006.01)
*G02B 26/10* (2006.01)

(52) U.S. Cl.
CPC .......... *G03G 15/0409* (2013.01); *G02B 26/105* (2013.01)

(58) Field of Classification Search
CPC ........................ G03G 15/0409; G02B 26/105
USPC .................. 347/242, 257, 261–263
See application file for complete search history.

(56) References Cited

U.S. PATENT DOCUMENTS

2013/0162745 A1\*  6/2013  Okada ........................... 347/118

FOREIGN PATENT DOCUMENTS

JP      2011-170027 A     9/2011

\* cited by examiner

*Primary Examiner* — Sarah Al Hashimi
(74) *Attorney, Agent, or Firm* — Canon U.S.A., Inc. IP Division

(57) ABSTRACT

There is provided an optical scanning device and an image forming apparatus including the optical scanning device. The optical scanning device includes an optical box containing light source units, a rotating polygon mirror, and a motor. In order to prevent the entire optical box from being deformed by deformation occurring in the installation region due to heat of the driving unit, the optical box includes a connection region between a second sidewall and an installation region where a driving unit is installed. The optical box further includes regions provided next to the connection region and having heights different from each other. A concave portion is formed in the connection region.

13 Claims, 9 Drawing Sheets

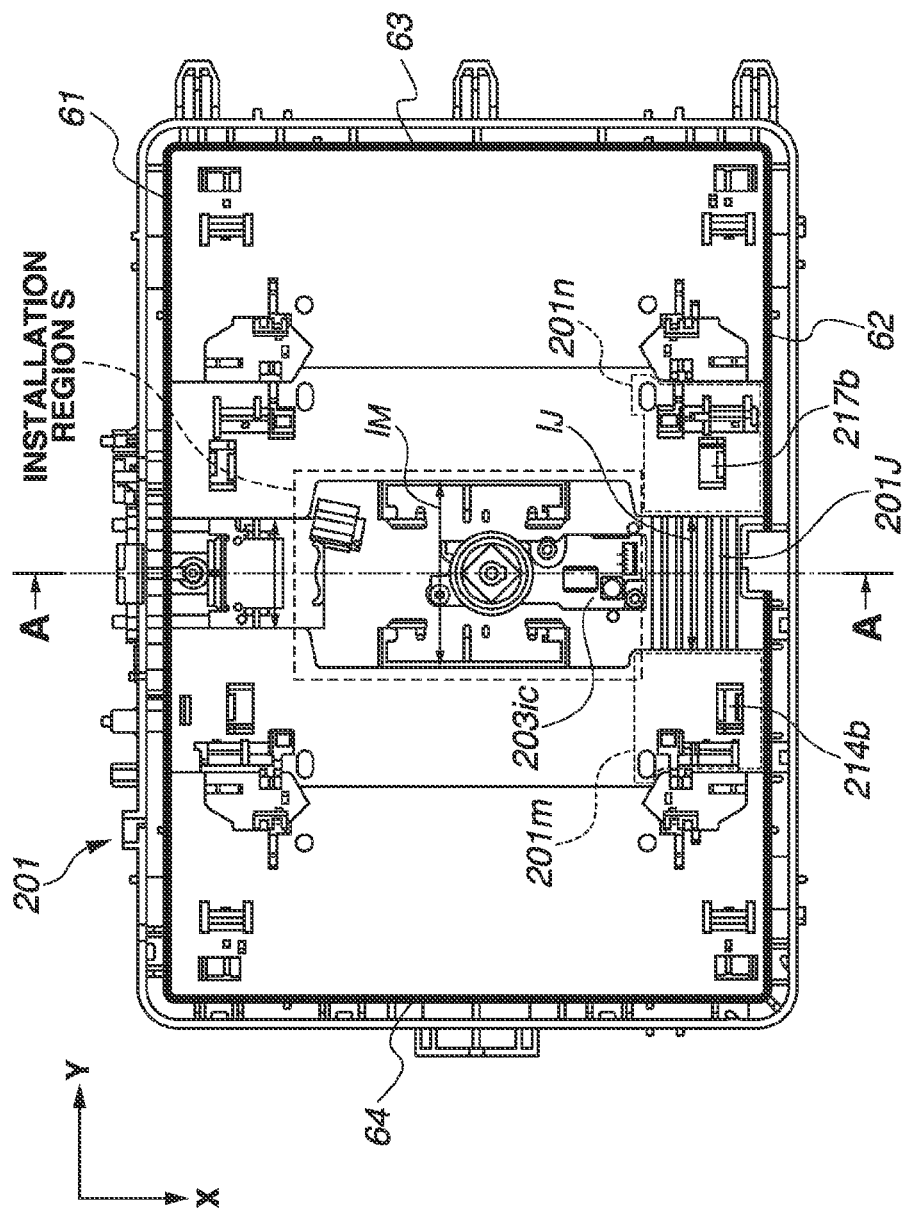

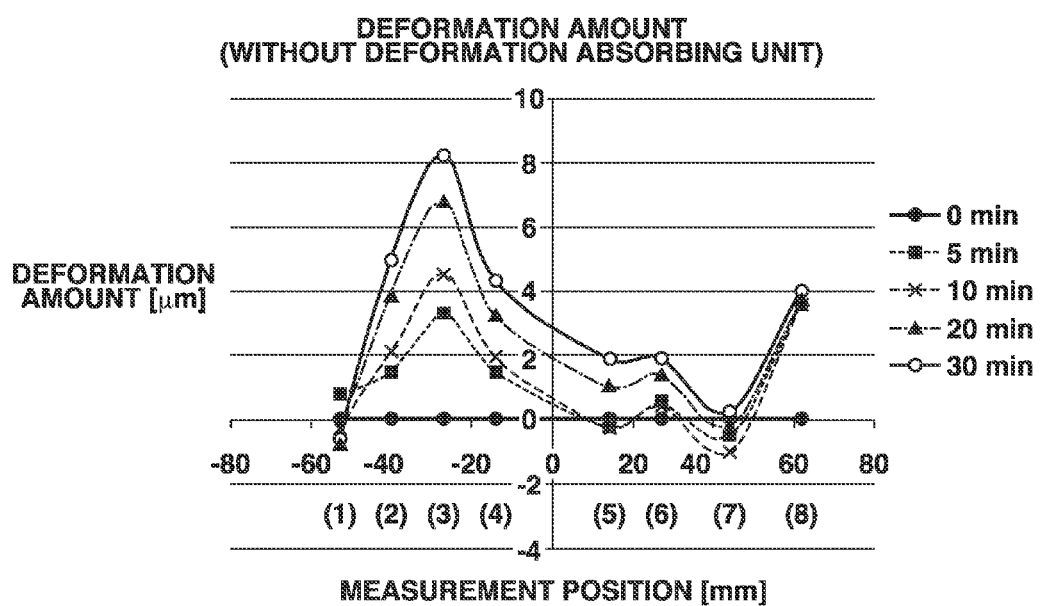
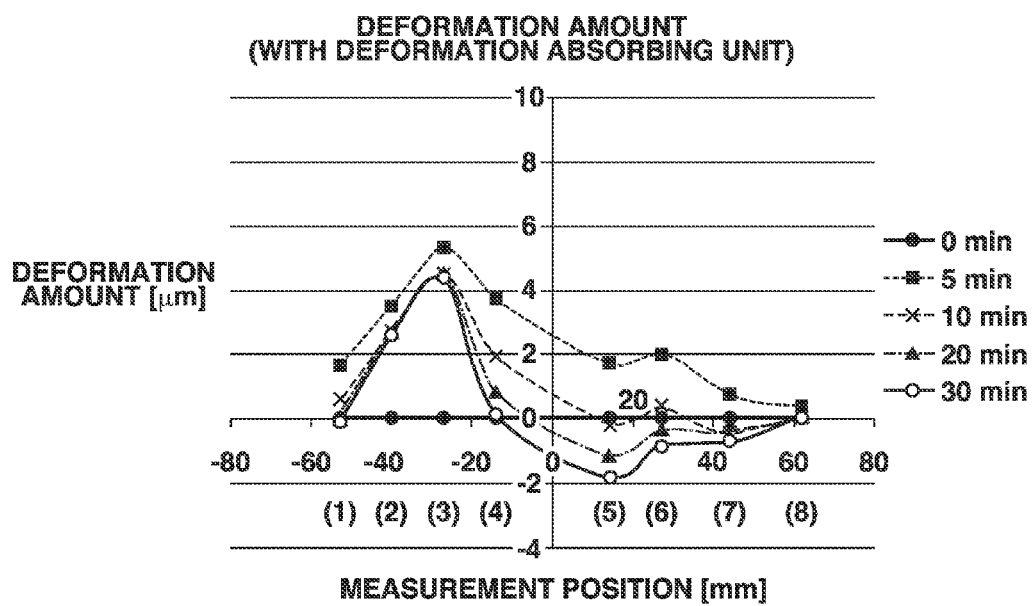

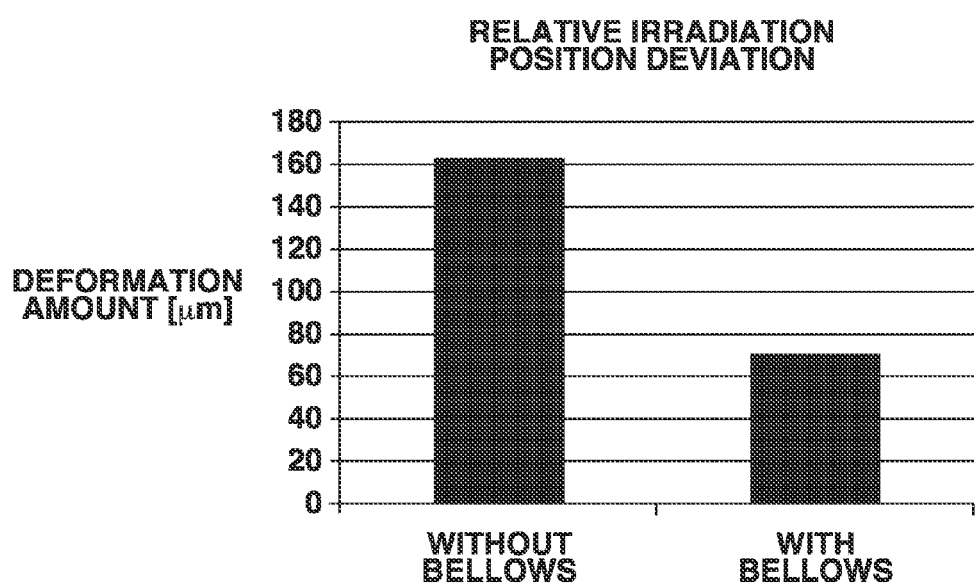

OPTICAL SCANNING DEVICE AND IMAGE FORMING APPARATUS

BACKGROUND OF THE INVENTION

1. Field of the Invention

The present invention relates to an optical scanning device mounted on an image forming apparatus.

2. Description of the Related Art

An optical scanning device used in an image forming apparatus employing an electrophotographic method includes optical components such as a light source, a rotating polygon mirror, an fθ lens, and a reflection mirror. A light beam is emitted from the light source according to an image signal, and then deflected by the rotating polygon mirror that is driven to rotate. The deflected light beam is reflected by the optical component such as the reflection mirror, and then a photosensitive member including a photosensitive layer is irradiated with this light beam. As a result, an electrostatic latent image based on the image signal is formed on the photosensitive member.

This optical scanning device includes a motor used for driving the rotating polygon mirror to rotate and an integrated circuit (IC) used for controlling the motor. In this optical scanning device, thermal expansion of an optical box occurs due to the heat produced by the motor and the IC, which leads to deformation of the optical box. This deformation results in a change in a relative position of the optical component contained in the optical box. As a result, the optical scanning device cannot form an electrostatic latent image at a desired position on the photosensitive member, which reduces quality of an output image.

There is known a technique that suppresses a change in a relative position of an optical component caused by heat from driving units, by providing slits around an installation region where the driving units are disposed (see, for example, Japanese Patent Application Laid-Open No. 2011-170027). The driving units include a motor and an IC that are used for driving a rotating polygon mirror to rotate. In other words, when thermal expansion of an optical box occurs due to the heat of the driving units, the slits provided in the optical box absorb deformation of the optical box.

Here, when a rotation speed of the rotating polygon mirror is increased to increase a printing speed of an image forming apparatus, the amount of heat generated from the driving units grows. This leads to an increase in deformation amount of the optical box. Therefore, it is necessary to increase the width of each of the slits provided in the optical box, to extend the length of each of the slits, or to increase the number of the slits. However, when the width of the slit, the length of the slit, or the number of the slits is increased, rigidity of the optical box considerably decreases, which is a problem.

SUMMARY OF THE INVENTION

The present invention is directed to an optical scanning device and an image forming apparatus capable of suppressing deformation of the entire optical box, which occurs due to deformation in the installation region caused by heat of a driving unit included therein.

According to an aspect of the present invention, an optical scanning device includes a deflection unit including a rotating polygon mirror configured to deflect a first light beam emitted from a first light source and a second light beam emitted from a second light source, such that the first light beam scans a first photosensitive member and the second beam scans a second photosensitive member wherein the rotating polygon mirror is configured to deflect the first light beam and the second light beam in respective directions opposite to each other in respect to the rotating polygon mirror, a motor configured to cause the rotating polygon mirror to rotate, and a driving unit configured to drive the motor, a first reflection mirror configured to guide the first light beam deflected by the rotating polygon mirror, onto the first photosensitive member, a second reflection mirror configured to guide the second light beam deflected by the rotating polygon mirror, onto the second photosensitive member, and an optical box including a bottom, to which the deflection unit, the first reflection mirror, and the second reflection mirror are attached, and sidewalls standing from the bottom, and including the first light source and the second light source are attached, wherein the bottom includes a wave-shaped bottom having a wave shape in cross section in a scanning direction of the light beam deflected by the rotating polygon mirror and the wave-shaped bottom is provided in a region surrounded by one of the sidewalls located opposite a light path of each of the first light beam and the second light beam that are incident on the rotating polygon mirror in the scanning direction, the deflection unit, the first reflection mirror, and the second reflection mirror.

According to another aspect of the present invention, an optical scanning device includes a light source, a rotating polygon mirror configured to deflect a light beam emitted from the light source, a driving unit configured to drive the rotating polygon mirror to rotate, and an optical box containing the rotating polygon mirror and the driving unit, wherein the optical box includes, an installation region in which the rotating polygon mirror and the driving unit are installed, a first sidewall to which the light source is fixed, a second sidewall provided opposite the first sidewall, relative to the rotating polygon mirror, a bottom to which a first optical component configured to guide a first light beam deflected by the rotating polygon mirror to a first photosensitive member, and a second optical component configured to guide a second light beam deflected by the rotating polygon mirror to a second photosensitive member different from the first photosensitive member and that is provided opposite the first optical component relative to the rotating polygon mirror are attached, and a connection region provided between the first optical component and the second optical component, and connecting the second sidewall to the installation region, and having a height different from a height of the bottom in a height direction orthogonal to the bottom, and wherein the connection region includes, a first wall provided on the first optical component side, and connecting the bottom to the connection region, a second wall provided on the second optical component side, and connecting the bottom to the connection region, and a wave-shaped region having a wave shape in a cross section that is orthogonal to the connection region without intersecting the first wall and the second wall.

Further features of the present invention will become apparent from the following description of exemplary embodiments with reference to the attached drawings.

BRIEF DESCRIPTION OF THE DRAWINGS

FIG. 3 is a top view illustrating a configuration of a connection region in the optical scanning device according to the first exemplary embodiment.

FIGS. 6A and 6B are diagrams each illustrating a result of measuring a deformation amount of an optical box according to the first exemplary embodiment.

FIG. 7 is a diagram illustrating a result of measuring deviation of a relative position of an optical component when the optical scanning device is deformed.

DESCRIPTION OF THE EMBODIMENTS

Various exemplary embodiments, features, and aspects of the invention will be described in detail below with reference to the drawings.

<Image Forming Apparatus>

Figure 1:
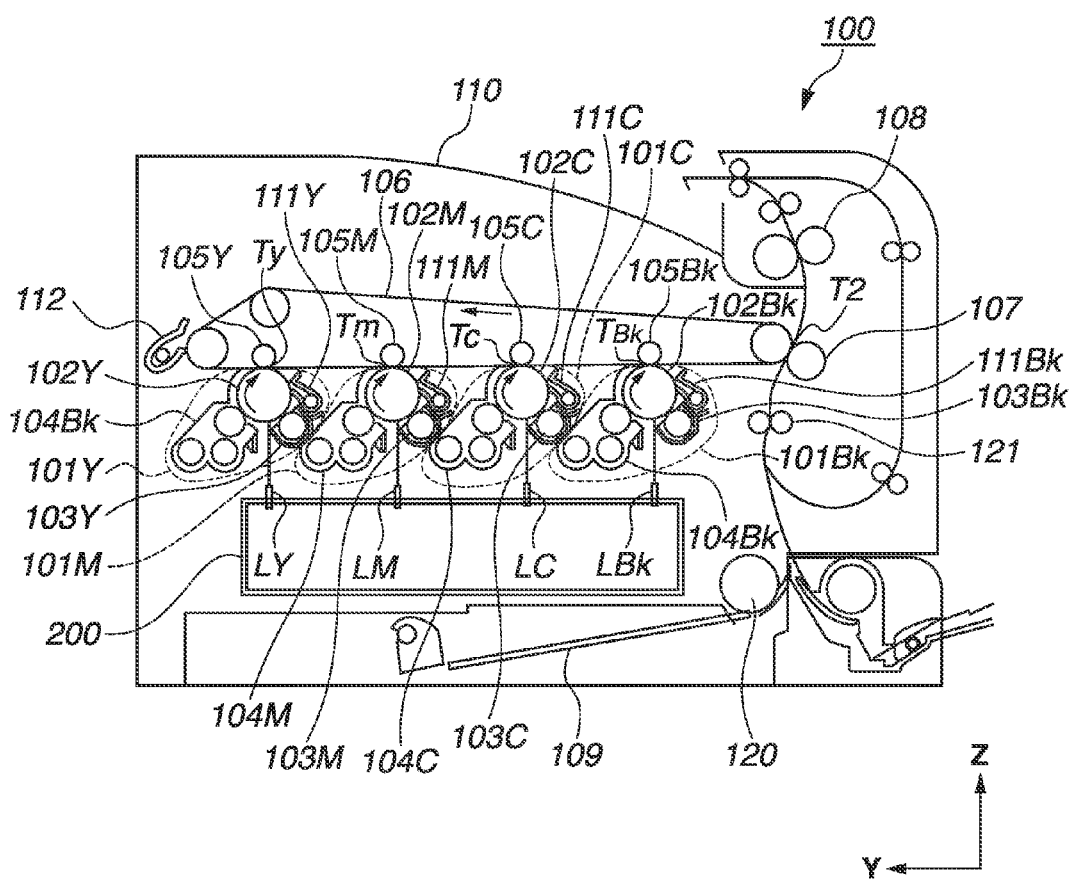
FIG. 1 is a schematic cross-sectional diagram of an image forming apparatus.

A first exemplary embodiment will be described. FIG. 1 is a schematic cross-sectional diagram of an image forming apparatus 100 employing an electrophotographic method. The image forming apparatus 100 illustrated in FIG. 1 includes four image forming units 101Y, 101M, 101C, and 101Bk for forming toner images of colors of yellow, magenta, cyan, and black, respectively. The image forming units 101Y, 101M, 101C, and 101Bk include photosensitive drums 102Y, 102M, 102C, and 102Bk, respectively, which are photosensitive members. These photosensitive drums 102Y, 102M, 102C, and 102Bk are arranged at different positions in a horizontal direction. Further, the image forming units 101Y, 101M, 101C, and 101Bk include charging devices 103Y, 103M, 103C, and 103Bk, respectively, for charging the photosensitive drums 102Y, 102M, 102C, and 102Bk, respectively. The image forming units 101Y, 101M, 101C, and 101Bk further include development devices 104Y, 104M, 104C, and 104Bk, respectively, for developing electrostatic latent images on the photosensitive drums 102Y, 102M, 102C, and 102Bk, respectively, by using toner. Furthermore, the image forming units 101Y, 101M, 101C, and 101Bk include cleaning devices 111Y, 111M, 111C, and 111Bk, respectively, for removing residual toner on the photosensitive drums 102Y, 102M, 102C, and 102Bk, respectively, from these photosensitive drums.

The image forming apparatus 100 further includes an optical scanning device 200, transfer rollers 105Y, 105M, 105C, and 105Bk, an intermediate transfer belt 106, a cleaning device 112, a storage unit 109, a paper discharge unit 110, a transfer roller 107, and a fixing device 108. The storage unit 109 stores recording materials. It is to be noted that the optical scanning device 200 is disposed between the storage unit 109 and the image forming units 101Y, 101M, 101C, and 101Bk, in a vertical direction.

Next, an image forming process will be described. The optical scanning device 200 emits light beams (laser beams) LY, LM, LC, and LBk. The photosensitive drums 102Y, 102M, 102C, and 102Bk charged by the charging devices 103Y, 103M, 103C, and 103Bk, respectively, are exposed to the light beams LY, LM, LC, and LBk, respectively. As a result, the electrostatic latent images are formed on the photosensitive drums 102Y, 102M, 102C, and 102Bk.

The development device 104Y develops the electrostatic latent image formed on the photosensitive drum 102Y by the toner of yellow. The development device 104M develops the electrostatic latent image formed on the photosensitive drum 102M by the toner of magenta. The development device 104C develops the electrostatic latent image formed on the photosensitive drum 102C by the toner of cyan. The development device 104Bk develops the electrostatic latent image formed on the photosensitive drum 102Bk by the toner of black.

The toner image of yellow formed on the photosensitive drum 102Y is transferred to the intermediate transfer belt 106 at a transfer portion Ty by the transfer roller 105Y. The intermediate transfer belt 106 is an intermediate transfer member. The cleaning device 111Y collects the toner that remains on the photosensitive drum 102Y without having been transferred to the intermediate transfer belt 106. The remaining toner is present in a range between the transfer portion Ty and a charging portion of the charging device 103Y, in a rotation direction of the photosensitive drum 102Y.

The toner image of magenta formed on the photosensitive drum 102M is transferred to the intermediate transfer belt 106 at a transfer portion Tm by the transfer roller 105M. The cleaning device 111M collects the toner that remains on the photosensitive drum 102M without having been transferred to the intermediate transfer belt 106. The remaining toner is present in a range between the transfer portion Tm and a charging portion of the charging device 103M, in a rotation direction of the photosensitive drum 102M.

The toner image of cyan formed on the photosensitive drum 102C is transferred to the intermediate transfer belt 106 at a transfer portion Tc by the transfer roller 105C. The cleaning device 111C collects the toner that remains on the photosensitive drum 102C without having been transferred to the intermediate transfer belt 106. The remaining toner is present in a range between the transfer portion Tc and a charging portion of the charging device 103C, in a rotation direction of the photosensitive drum 102C.

The toner image of black formed on the photosensitive drum 102Bk is transferred to the intermediate transfer belt 106 at a transfer portion TBk by the transfer roller 105Bk. The cleaning device 111Bk collects the toner that remains on the photosensitive drum 102Bk without having been transferred to the intermediate transfer belt 106. The remaining toner is present in a range between the transfer portion TBk and a charging portion of the charging device 103Bk, in a rotation direction of the photosensitive drum 102Bk.

The cleaning devices 111Y, 111M, 111C, and 111Bk each include a blade that abuts the corresponding photosensitive drum. The cleaning devices 111Y, 111M, 111C, and 111Bk each collect the toner remaining on the corresponding photosensitive drum, by scraping the remaining toner with the blade.

The image forming units 101Y, 101M, 101C, and 101Bk sequentially transfer the toner images corresponding to the respective color components onto the intermediate transfer belt 106, to overlay the one toner image on another. As a result, the toner images of full colors are formed on the intermediate transfer belt 106.

The toner images transferred onto the intermediate transfer belt 106 are conveyed to a transfer portion T2, according to the rotation of the intermediate transfer belt 106 in an arrow direction. At that time, a feed roller 120 feeds the recording materials in the storage unit 109 one by one, and then conveyance rollers 121 convey each of these recording materials to the transfer portion T2. The conveyance rollers 121 adjust the sheet position and the delivery timing of each of the recording materials fed by the feed roller 120. The conveyance rollers 121 then supply each of the recording materials to the transfer portion T2, so that each of the recording materials is brought into contact with the toner images on the intermediate transfer belt 106. In other words, the feed roller 120 and the conveyance rollers 121 function as a conveyance unit that conveys the recording materials from the storage unit 109 towards the paper discharge unit 110. Further, a path for conveying the recording materials from the storage unit 109 to the paper discharge unit 110 corresponds to a conveyance path.

When the toner images transferred onto the intermediate transfer belt 106 and the recording material sent by the conveyance rollers 121 enter the transfer portion T2, a transfer voltage is applied to the transfer roller 107. As a result, the toner images on the intermediate transfer belt 106 are transferred onto the recording material. The recording material onto which the toner images have been transferred at the transfer portion T2 is conveyed to the fixing device 108. The fixing device 108 fixes the toner images to the recording material, by heating the recording material while conveying the recording material. The recording material to which the toner images have been fixed is then discharged to the paper discharge unit 110.

In other words, the image forming units 101Y, 101M, 101C, and 101Bk, the intermediate transfer belt 106, and the transfer roller 107 function as an image forming unit provided between the storage unit 109 and the paper discharge unit 110 in the vertical direction.

The image forming apparatus 100 includes the cleaning device 112 between the transfer portion T2 and the transfer portion Ty in a rotation direction of the intermediate transfer belt 106. The cleaning device 112 includes a blade that contacts the intermediate transfer belt 106. The cleaning device 112 cleans the toner remaining on the intermediate transfer belt 106 without having been transferred to the recording material, by scraping the remaining toner with the blade.

<Optical Scanning Device>

Figure 2A:
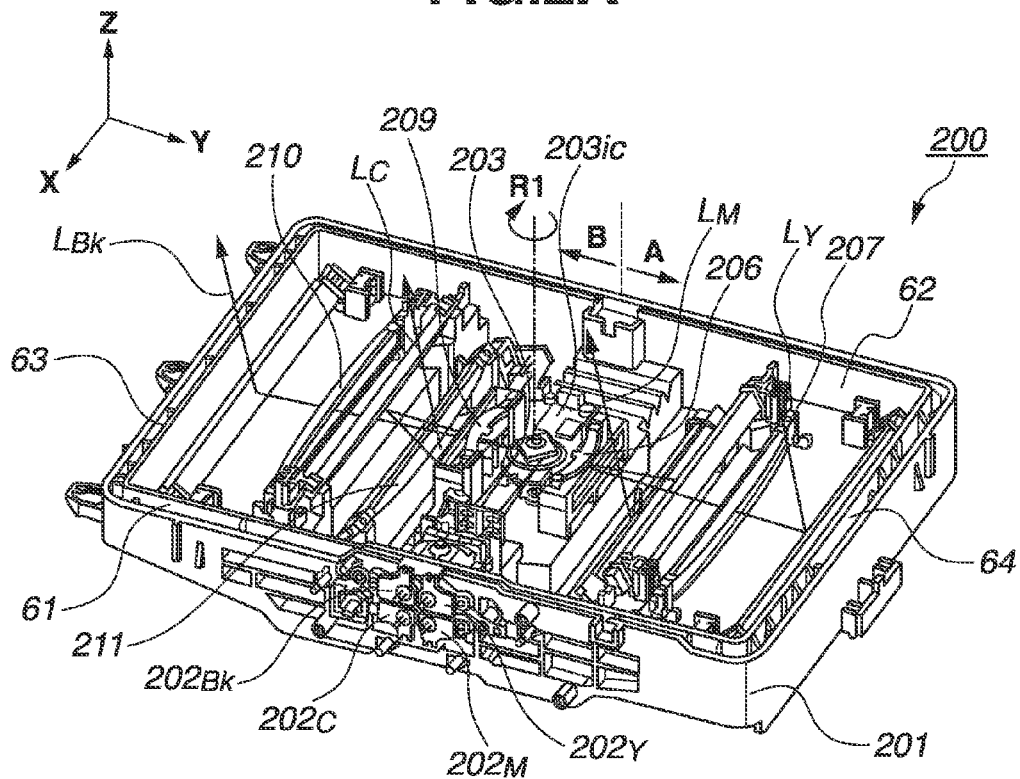
FIGS. 2A and 2B are a perspective diagram and a cross-sectional diagram each illustrating a configuration of an optical scanning device according to a first exemplary embodiment.
Figure 2B:
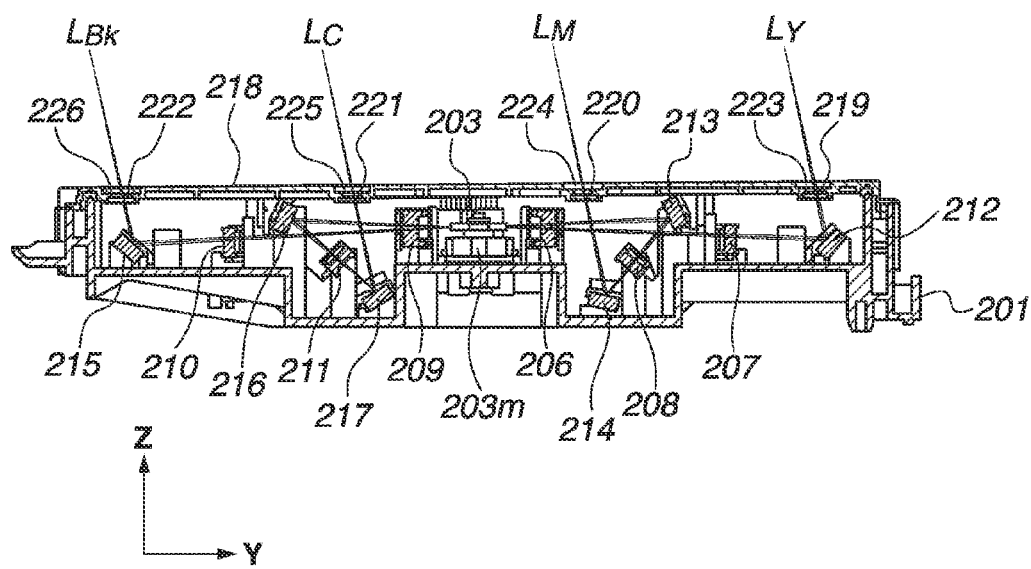

Next, the optical scanning device 200 will be described. FIG. 2A is a perspective diagram illustrating a configuration of the optical scanning device 200. FIG. 2B is a cross-sectional diagram of the optical scanning device 200.

As illustrated in FIG. 2A, in the optical scanning device 200, optical components are housed in an optical box 201. The optical box 201 has a first sidewall 61, a second sidewall 62, a third sidewall 63, and a fourth sidewall 64. In the optical box 201, the longitudinal direction of the first sidewall 61 and the longitudinal direction of the second sidewall 62 are parallel to each other. Further, the longitudinal direction of the first sidewall 61 and the longitudinal direction of the second sidewall 62 are orthogonal to the longitudinal direction of each of the third sidewall 63 and the fourth sidewall 64. Light source units 202Y, 202M, 202C, and 202Bk are attached to the first sidewall 61 of the optical box 201. The light source unit 202Y emits the laser beam LY for the exposure of the photosensitive drum 102Y, and the light source unit 202M emits the laser beam LM for the exposure of the photosensitive drum 102M. Further, the light source unit 202C emits the laser beam LC for the exposure of the photosensitive drum 102C, and the light source unit 202Bk emits the laser beam LBk for the exposure of the photosensitive drum 102Bk. The light source units 202Y, 202M, 202C, and 202Bk are disposed close to each other.

As illustrated in FIG. 2A, a polygon mirror (a rotating polygon mirror) 203 including four reflection surfaces is disposed in a central part of the optical box 201. In image formation, the polygon mirror 203 is driven by a motor 203m (FIG. 2B) to rotate in an R1 direction, about a rotation shaft indicated by a dotted line in FIG. 2A.

Here, a plane to which the rotation shaft of the polygon mirror 203 is perpendicular is defined as a virtual plane. The laser beam LY emitted from the light source unit 202Y and the laser beam LBk emitted from the light source unit 202Bk are each incident on the reflection surface of the polygon mirror 203, along a light path directed to the virtual plane diagonally from above. On the other hand, the laser beam LC emitted from the light source unit 202C and the laser beam LM emitted from the light source unit 202M are each incident on the reflection surface of the polygon mirror 203, along a light path directed to the virtual plane diagonally from below.

The laser beam LY emitted from the light source unit 202Y is incident on the reflection surface of the polygon mirror 203. The laser beam LY is then deflected (reflected) by the reflection surface of the polygon mirror 203, to an A side illustrated in FIG. 2A. The laser beam LM emitted from the light source unit 202M is incident on the same reflection surface of the polygon mirror 203 as the reflection surface on which the laser beam LY is incident. The laser beam LM is then deflected by the reflection surface of the polygon mirror 203, to the same side (the A side) as the side to which the laser beam LY is deflected. Here, a direction to the A side corresponds to a first direction.

On the other hand, the laser beam LBk emitted from the light source unit 202Bk is incident on the reflection surface different from the reflection surface on which the laser beams LY and LM are incident. The laser beam LBk is deflected by the reflection surface of the polygon mirror 203, to a B side illustrated in FIG. 2A. The laser beam LC emitted from the light source unit 202C is incident on the same reflection surface of the polygon mirror 203 as the reflection surface on which the laser beam LBk is incident. The laser beam LC is then deflected by the reflection surface of the polygon mirror 203, to the same side (the B side) as the side to which the laser beam LBk is deflected. Here, a direction to the B side corresponds to a second direction.

The laser beams LY and LM deflected by the polygon mirror 203 each travel in a +X direction (a scanning direction). In other words, upon being deflected by the rotating polygon mirror 203, the laser beam LY scans the photosensitive drum 102Y in the +X direction, and the laser beam LM scans the photosensitive drum 102M in the +X direction.

On the other hand, the laser beams LBk and LC deflected by the polygon mirror 203 each travel in a −X direction (a scanning direction). In other words, upon being deflected by the rotating polygon mirror 203, the laser beam LBk scans the photosensitive drum 102Bk in the −X direction, and the laser beam LC scans the photosensitive drum 102C in the −X direction.

In other words, the optical scanning device 200 is of an opposed scanning type. Specifically, the laser beams LY and LM emitted from the light source units 202Y and 202M are deflected by the polygon mirror 203 to the A side, while the laser beams LC and LBk emitted from the light source units 202C and 202Bk are deflected by the polygon mirror 203 to the B side, for the exposure of the photosensitive drums 102Y, 102M, 102C, and 102Bk.

Next, a light path of each of the laser beams LY, LM, LC, and LBk deflected by the polygon mirror 203 will be described with reference to FIG. 2B. As illustrated in FIG. 2B, the optical components are attached to the inside of the optical box 201. The optical components include the polygon mirror 203, the motor 203m, lenses 206, 207, 208, 209, 210, and 211, and reflection mirrors 212, 213, 214, 215, 216, and 217. Further, a cover 218 is attached to the optical box 201, to protect the polygon mirror 203, the lenses 206 to 207, and the reflection mirrors 212 to 217 from dust.

The laser beam LY deflected by the polygon mirror 203 is incident on the reflection mirror 212, after passing through the lenses 206 and 207. The reflection mirror 212 reflects the incident laser beam LY towards the photosensitive drum 102Y. The cover 218 has an opening 219. The laser beam LY reflected by the reflection mirror 212 can pass through the opening 219. The opening 219 is blocked by a transparent dust-proofing window 223 through which the laser beam LY can pass. The laser beam LY that has passed through the dust-proofing window 223 forms an image on the photosensitive drum 102Y.

The laser beam LM deflected by the polygon mirror 203 is incident on the reflection mirror 213, after passing through the lens 206. The reflection mirror 213 reflects the incident laser beam LM towards the lens 208. The laser beam LM reflected by the reflection mirror 213 is incident on the reflection mirror 214 after passing through the lens 208. The reflection mirror 214 reflects the incident laser beam LM towards the photosensitive drum 102M. The cover 218 has an opening 220. The laser beam LM reflected by the reflection mirror 214 can pass through the opening 220. The opening 220 is blocked by a transparent dust-proofing window 224 through which the laser beam LM can pass. The laser beam LM that has passed through the dust-proofing window 224 forms an image on the photosensitive drum 102M.

The laser beam LBk deflected by the polygon mirror 203 is incident on the reflection mirror 215, after passing through the lenses 209 and 210. The reflection mirror 215 reflects the laser beam LBk towards the photosensitive drum 102Bk. The cover 218 has an opening 222. The laser beam LBk reflected by the reflection mirror 215 can pass through the opening 222. The opening 222 is blocked by a transparent dust-proofing window 226 through which the laser beam LBk can pass. The laser beam LBk that has passed through the dust-proofing window 226 forms an image on the photosensitive drum 102Bk.

The laser beam LC deflected by the polygon mirror 203 is incident on the reflection mirror 216, after passing through the lens 209. The reflection mirror 216 reflects the incident laser beam LC towards the lens 211. The laser beam LC reflected by the reflection mirror 216 is incident on the reflection mirror 217 after passing through the lens 211. The reflection mirror 217 reflects the incident laser beam LC towards the photosensitive drum 102C. The cover 218 has an opening 221. The laser beam LC reflected by the reflection mirror 217 can pass through the opening 221. The opening 221 is blocked by a transparent dust-proofing window 225 through which the laser beam LC can pass. The laser beam LC that has passed through the dust-proofing window 225 forms an image on the photosensitive drum 102C.

In the present exemplary embodiment, the polygon mirror 203 is disposed higher than the reflection mirrors 214 and 217 in a vertical direction (a Z direction). In other words, in a rotation-shaft direction of the polygon mirror 203, an installation region S is located higher than a bottom surface where the reflection mirrors 214 and 217 are disposed. The polygon mirror 203, the motor 203$m$, and an IC 203$ic$ that are provided to control the polygon mirror 203 are disposed in the installation region S. Therefore, the reflection mirrors 213, 214, 216 and 217 can be disposed close to the polygon mirror 203. As a result, the distance between the laser beam LM reflected by the reflection mirror 214 and the laser beam LC reflected by the reflection mirror 217 can be reduced. In other words, the distance between the photosensitive drum 102M and the photosensitive drum 102C can be reduced. Therefore, the image forming apparatus 100 can be downsized.

<Description of Connection Region>

Incidentally, it has been found by experiment that, the temperature of the installation region S rises by 15° C. or more in a few minutes after driving of the motor 203$m$ is started. When the temperature of the installation region S locally increases, linear expansion of the installation region S occurs, which causes deformation of the optical box 201. This changes the postures of the reflection mirrors disposed in the optical box 201, which in turn changes irradiation positions irradiated with the light beams LM and LC on the photosensitive drums 102M and 102C. It has been found by experiment that, when the angle of the reflection mirror 214 changes by a few degrees, the position irradiated with the light beam LM on the photosensitive drum 102M shifts by 40 to 50 μm. As a result, a formation position of an image for each color component on each of the photosensitive drums 102Y, 102M, 102C and 102Bk is deviated from a target position. Therefore, for example, a color shift occurs when a full-color image is formed by overlaying the images of the respective color components one on another.

Conventionally, when the above-described formation position is deviated from the target position, color-shift correction processing is executed. This processing is executed to correct a position where an electrostatic latent image is to be formed on each of the photosensitive drums 102Y, 102M, 102C and 102Bk by the optical scanning device 200. However, when the image forming apparatus 100 executes the color-shift correction processing, it is necessary to suspend the image formation. Thus, it is conceivable to increase a frequency of executing the color-shift correction processing. However, increasing this frequency leads to a decrease in productivity of the image forming apparatus 100.

Therefore, in the present exemplary embodiment, the optical box 201 is provided with a connection region 201J including a bellows-shaped deformation absorbing portion. The connection region 201J is provided to absorb thermal expansion of the optical box 201 caused by heat generated from the motor 203$m$ and the IC 203$ic$ for controlling the motor 203$m$. The deformation absorbing portion has a wave shape in cross section and therefore may be a wave-shaped region or a wave-shaped bottom. A configuration of the connection region 201J will be described below with reference to FIGS. 3 and 4.

Figure 4:
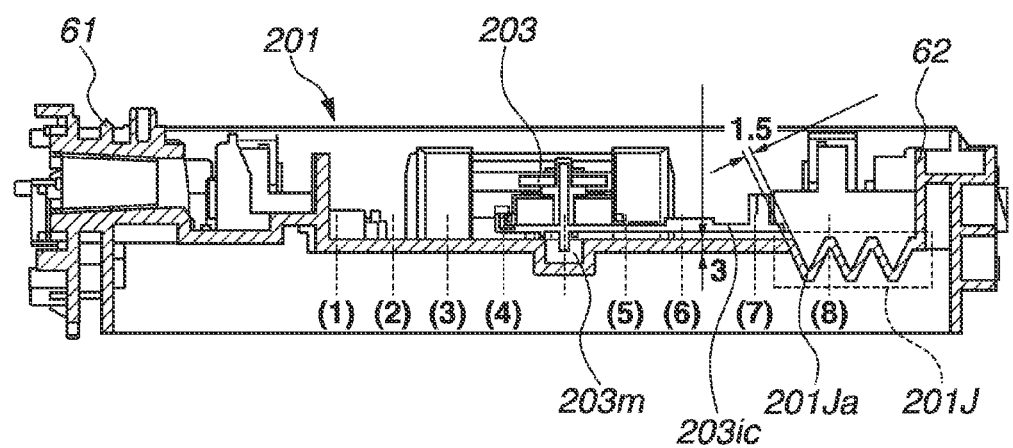
FIG. 4 is a cross-sectional diagram illustrating a configuration of the connection region in the optical scanning device according to the first exemplary embodiment.

As illustrated in FIG. 3, the connection region 201J is provided to connect the second sidewall 62 to the installation region S. The second sidewall 62 is located opposite the first sidewall 61, relative to the polygon mirror 203. To the first fixed sidewall 61, the light source units 202Y, 202M, 202C and 202Bk are fixed. FIG. 4 is a cross-sectional diagram illustrating the optical scanning device 200 in FIG. 3 taken along a line A-A. Further, as illustrated in FIG. 4, one or more valley portions 201Ja that are concave portions are formed in the connection region 201J. The valley portions 201Ja are aligned in a direction (an X direction) orthogonal to the second sidewall 62. In this deformation absorbing portion, a peak point of each of the valley portions 201Ja is located lower than an installation surface where the IC 203$ic$ is installed in the installation region S, in the rotation-shaft direction of the polygon mirror 203. Therefore, the connection region 201J can absorb deformation of the installation region S, i.e. expansion or shrinkage of the installation region S with respect to the second sidewall 62. In other words, the connection region 201J can suppress propagation of deformation in the installation region S to the second sidewall 62. This deformation in the installation region S occurs, when the temperature of the installation region S locally rises due to the heat of the polygon mirror 203*m* and the IC 203*ic*.

Further, the connection region 201J is located higher than a region 201*m* and a region 201*n* of a bottom, in the vertical direction (Z direction). In the region 201*m*, a bearing surface 214*b* supporting the reflection mirror 214 is located. In the region 201*n*, a bearing surface 217*b* supporting the reflection mirror 217 is located. Therefore, deformation of a deformation region of the connection region 201J towards the third sidewall 63 side or the fourth sidewall 64 side can be suppressed. The regions 201*m* and 201*n* are provided next to the connection region 201J. Further, the region 201*n* is located opposite the region 201*m*, relative to the connection region 201J.

Furthermore, as illustrated in FIG. 3 and FIG. 4, the valley portions 201Ja are formed from one wall on the region 201*m* side in the connection region 201J to the other wall on the region 201*n* side in the connection region 201J. In other words, the valley portions 201Ja are formed from one wall standing in the region 201*n* to the other wall standing in the region 201*m*. Therefore, propagation of the deformation occurred in the installation region S to the second sidewall 62 can be more suppressed than in a configuration in which the valley portions 201Ja are not thus formed.

As illustrated in FIG. 3, a width $l_J$ of the connection region 201J in a direction (a Y direction) parallel to the second sidewall 62 is smaller than a width $l_M$ of the installation region S in the direction (the Y direction) parallel to the second sidewall 62. In this configuration, the bearing surfaces 214*b* and 217*b* for installing the reflection mirrors 214 and 217, respectively, in the optical box 201 can be provided close to the polygon mirror 203. In other words, the image forming apparatus 100 can be downsized by reducing the distance between the laser beams LM and LC reflected by the reflection mirror 214 and 217, respectively.

AS illustrated in FIG. 4, in the present exemplary embodiment, for example, the bottom of the optical box 201 has a thickness of 3 mm in the installation region S, and the deformation absorbing portion has a thickness of 1.5 mm. In other words, in the present exemplary embodiment, the thickness of the deformation absorbing portion is smaller than the thickness of the bottom of the optical box 201. Therefore, strength of the deformation absorbing portion is less than strength of the optical box 201. Thus, even when deformation occurs in the installation region S whose temperature has locally increased due to the heat of the motor 203*m* and the IC 203*ic*, deformation of a part except the deformation absorbing portion can be suppressed by the deformation of the deformation absorbing portion.

Figure 5:
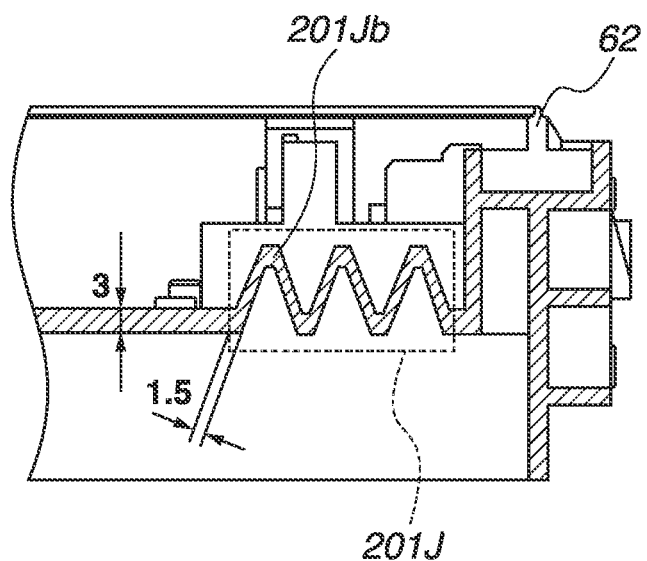
FIG. 5 is a cross-sectional diagram illustrating a modification of the connection region in the optical scanning device according to the first exemplary embodiment.

Further, as illustrated in FIG. 5, the connection region 201J may include a deformation absorbing portion in which one or more peak portions 201Jb that are convex portions are formed. In this deformation absorbing portion, a top of each of the peak portions 201Jb is located higher than the installation surface where the IC 203*ic* is installed in the installation region S, in the rotation-shaft direction of the polygon mirror 203.

Furthermore, the peak portions 201Jb are preferably formed from one wall on the region 201*m* side in the connection region 201J to the other wall on the region 201*n* side in the connection region 201J. In this configuration, likewise, when deformation occurs in the installation region S whose temperature has locally increased due to the heat of the motor 203*m* and the IC 203*ic*, deformation of a part except the deformation absorbing portion can be suppressed by deformation of the deformation absorbing portion.

In addition, in the deformation absorbing portion, the valley portion 201Ja and the peak portion 201Jb may be alternately formed without a break. In other words, the deformation absorbing portion may only have a triangular wave shape or a sine wave shape in cross section. Further, the valley portions 201Ja and the peak portions 201Jb are preferably formed from one wall on the region 201*m* side in the connection region 201J to the other wall on the region 201*n* side in the connection region 201J.

FIGS. 6A and 6B are diagrams each illustrating how a deformation amount of the bottom of the optical box 201 changes during a lapse of thirty minutes, after driving of the motor 203*m* is started. Here, circled figures of 1 to 8 in each of FIGS. 6A and 6B correspond to positions 1 to 8 (circled figures) at the bottom of the optical box 201 in FIG. 4.

As illustrated in FIGS. 6A and 6B, when deformation of the installation region S occurs due to heat of the motor 203*m* and the IC 203*ic*, this deformation propagates to the bottom of the optical box 201 and therefore, the deformation amount of the optical box 201 increases as time passes. In the optical box 201 without the deformation absorbing portion, the deformation amount at the position 3 is as much as about 8 μm in the vertical direction, after a lapse of thirty minutes after the start of rotation driving of the motor 203*m*. On the other hand, in the optical box 201 with the deformation absorbing portion, the deformation amount is less than 6 μm even after a lapse of thirty minutes following the start of rotation driving of the motor 203*m*. As illustrated in FIGS. 6A and 6B, the optical box 201 with the deformation absorbing portion has a maximum deformation amount smaller than a maximum deformation amount of the optical box 201 without the deformation absorbing portion.

FIG. 7 is a diagram illustrating an amount of relative irradiation position deviation calculated after the motor 203*m* is driven for thirty minutes. Here, the amount of relative irradiation position deviation corresponds to the sum of the following two kinds of deviation amounts. One is a deviation amount calculated when an irradiation position on a photosensitive drum is deviated upstream in the rotation direction of the photosensitive drum at maximum, from a target position. The other is a deviation amount calculated when the irradiation position is most deviated downstream in the rotation direction of the photosensitive drum at maximum, from the target position. The irradiation position is a position that has been irradiated with a light beam on the photosensitive drum, while the target position is a position supposed to be irradiated with a light beam on the photosensitive drum. As illustrated in FIG. 7, the amount of relative irradiation position deviation of the optical box 201 with the deformation absorbing portion is smaller than the amount of relative irradiation position deviation of the optical box 201 without the deformation absorbing portion, by 56%.

According to the present exemplary embodiment, a part of the connection region 201J connecting the second sidewall 62 to the installation region S includes the deformation absorbing portion. Therefore, even when deformation occurs in the installation region S due to the heat of the motor 203*m* and the IC 203*ic*, deformation of the optical box 201 due to the deformation in the installation region S can be suppressed.

Next, a second exemplary embodiment will be described. The present exemplary embodiment is different from the above-described first exemplary embodiment as follows. Of the present exemplary embodiment, components similar to the components of the above-described first exemplary embodiment will not be described.

Figure 8:
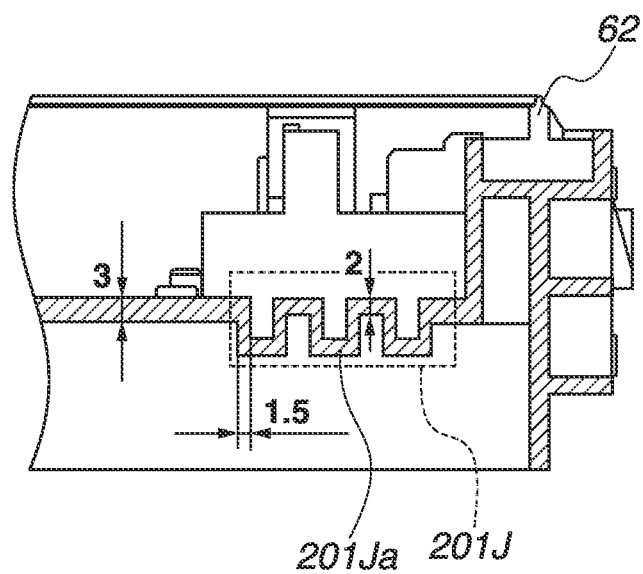
FIG. 8 is a cross-sectional diagram illustrating a configuration of a connection region in an optical scanning device according to a second exemplary embodiment.

In the first exemplary embodiment, the connection region 201J includes the deformation absorbing portion in which the valley portions 201Ja are continuously formed. On the other hand, in the present exemplary embodiment, a connection region 201J includes a deformation absorbing portion in which concave portions 201Ja are formed, as illustrated in FIG. 8. In this deformation absorbing portion, a bottom surface of each of the concave portions 201Ja is located lower than an installation surface where an IC 203*ic* is installed in an installation region S, in a rotation-shaft direction of a polygon mirror.

For example, in the present exemplary embodiment, a bottom of an optical box 201 has a thickness of 3 mm in the installation region S. Further, a horizontal part in each of the concave portions 201Ja has a thickness of 2 mm, while a vertical part in each of the concave portions 201Ja has a thickness of 1.5 mm. In other words, in the present exemplary embodiment, the thickness of the deformation absorbing portion is less than the thickness of the bottom of the optical box 201. Therefore, strength of the deformation absorbing portion is less than strength of the bottom of the optical box 201. As a result, even when deformation occurs in the installation region S whose temperature has locally increased due to heat of a motor 203*m* and the IC 203*ic*, deformation of a part except the deformation absorbing portion can be suppressed by deformation of the deformation absorbing portion.

Further, the concave portions 201Ja are formed from one wall on a region 201*m* side in the connection region 201J to the other wall on a region 201*n* side in the connection region 201J. Therefore, propagation of deformation occurring in the installation region S to a second sidewall 62 can be more suppressed than similar propagation in a configuration in which the concave portions 201Ja are not thus formed.

In the present exemplary embodiment, similar to the first exemplary embodiment, the connection region 201J may include a deformation absorbing portion in which a plurality of convex portions 201Jb are formed.

Figure 9:
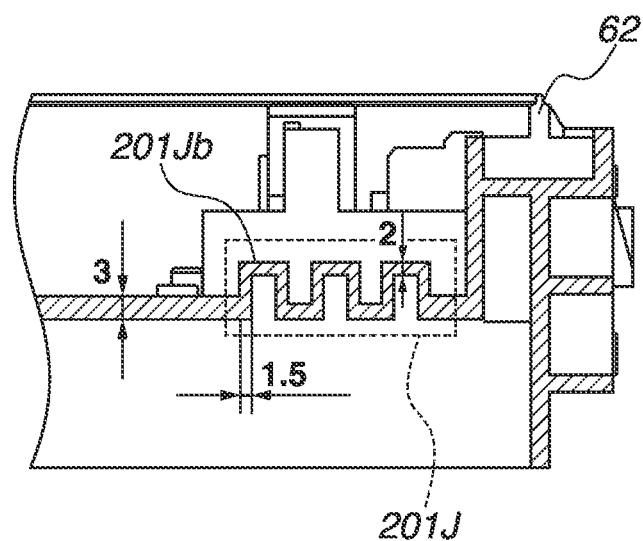
FIG. 9 is a cross-sectional diagram illustrating a modification example of the connection region in the optical scanning device according to the second exemplary embodiment.

Further, as illustrated in FIG. 9, the connection region 201J may include a deformation absorbing portion, similar to the first exemplary embodiment. One or more convex portions 201Jb are formed in the deformation absorbing portion. In this deformation absorbing portion, a top of each of the convex portions 201Jb is located higher than the installation surface where the IC 203*ic* is installed in the installation region S, in the rotation-shaft direction of the polygon mirror.

Furthermore, the convex portions 201Jb are preferably formed from one wall on the region 201*m* side in the connection region 201J to the other wall on the region 201*n* side in the connection region 201J.

In addition, in the deformation absorbing portion, the concave portion 201Ja and the convex portion 201Jb may be alternately formed without a break. In other words, the deformation absorbing portion may only have a rectangular wave shape in cross section. Further, the concave portions 201Ja and the convex portions 201Jb may be preferably formed from one wall on the region 201*m* side in the connection region 201J to the other wall on the region 201*n* side in the connection region 201J.

According to the present exemplary embodiment, a part of the connection region 201J connecting the second sidewall 62 to the installation region S includes the deformation absorbing portion. Therefore, even when deformation occurs in the installation region S due to the heat of the motor 203*m* and the IC 203*ic*, deformation of the optical box 201 due to the deformation in the installation region S can be suppressed.

According to exemplary embodiments of the present invention, even when deformation occurs in an installation region due to heat of a driving unit, deformation of an entire optical box resulting from the deformation in the installation region can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-153558 filed Jul. 24, 2013, which is hereby incorporated by reference herein in its entirety.

What is claimed is:

1. An optical scanning device comprising:
a deflection unit including:
a rotating polygon mirror configured to deflect a first light beam emitted from a first light source and a second light beam emitted from a second light source, such that the first light beam scans a first photosensitive member and the second beam scans a second photosensitive member, wherein the rotating polygon mirror is configured to deflect the first light beam and the second light beam in respective directions opposite to each other in respect to the rotating polygon mirror;
a motor configured to cause the rotating polygon mirror to rotate; and
a driving unit including a driving IC configured to drive the motor and with which the motor is provided;
a first reflection mirror configured to guide the first light beam deflected by the rotating polygon mirror, onto the first photosensitive member;
a second reflection mirror configured to guide the second light beam deflected by the rotating polygon mirror, onto the second photosensitive member; and
an optical box including a bottom, sidewalls standing from the bottom and to which the first light source and the second light source are attached,
wherein the bottom includes an installation region in which the deflection unit is installed, a first supporting region with which a first supporting portion, configured to support an end of the first reflection mirror, is provided, a second supporting region with which a second supporting portion, configured to support an end of the second reflection mirror, is provided, and a wave-shaped bottom having a wave shape in cross section in a scanning direction of the both light beams deflected by the rotating polygon mirror,
wherein the first supporting potion and the second supporting portion are provided on the bottom surrounded by the sidewalls,
wherein the wave-shaped bottom is provided in a region surrounded by a sidewall, which is included in the sidewalls, located opposite a light path of each of the first light beam and the second light beam that are incident on the rotating polygon mirror in the scanning direction, the installation region, the first supporting region, and the second supporting region, and
wherein the wave-shape bottom is connected to the installation region and the sidewall directly.

2. The optical scanning device according to claim 1, wherein the wave shape is a triangular wave shape.

3. The optical scanning device according to claim 1, wherein the wave shape is a rectangular wave shape.

4. The optical scanning device according to claim 1, wherein the wave shape is a sine wave shape.

5. The optical scanning device according to claim 1, wherein a thickness of the wave-shaped bottom is smaller than a thickness of the installation region.

6. The optical scanning device according to claim 1, further comprising:
- a first lens on which the first light beam deflected by the rotating polygon mirror is incident; and
- a second lens on which the second light beam deflected by the rotating polygon mirror is incident,
- wherein the bottom further includes an installation region in which the first lens, the second lens, and the deflection unit are installed, and
- wherein a width of the wave-shaped bottom is less than a width of the installation region, in an optical axis direction of the first lens.

7. An optical scanning device comprising:
- a light source;
- a rotating polygon mirror configured to deflect a light beam emitted from the light source;
- a driving unit including a motor and a driving IC, wherein the motor and the driving IC are configured to drive the rotating polygon mirror to rotate; and
- an optical box containing the rotating polygon mirror and the driving unit,
- wherein the optical box includes,
  - an installation region in which the rotating polygon mirror and the driving unit are installed,
  - a first sidewall to which the light source is fixed,
  - a second sidewall provided opposite the first sidewall, relative to the rotating polygon mirror,
  - a bottom to which first and second optical components are attached, wherein the first optical component is configured to guide a first light beam deflected by the rotating polygon mirror to a first photosensitive member, and the second optical component is configured to guide a second light beam deflected by the rotating polygon mirror to a second photosensitive member different from the first photosensitive member and that is provided opposite the first optical component relative to the rotating polygon mirror, and
  - a connection region provided between the first optical component and the second optical component, connecting the second sidewall to the installation region directly, and having a height different from a height of the bottom in a height direction orthogonal to the bottom, and
- wherein the connection region includes,
  - a first wall provided on the first optical component side, and connecting the bottom to the connection region,
  - a second wall provided on the second optical component side, and connecting the bottom to the connection region, and
  - a wave-shaped region having a wave shape in a cross section that is orthogonal to the connection region without intersecting the first wall and the second wall.

8. The optical scanning device according to claim 7, wherein the wave shape is a triangular wave shape.

9. The optical scanning device according to claim 7, wherein the wave shape is a rectangular wave shape.

10. The optical scanning device according to claim 7, wherein the wave shape is a sine wave shape.

11. The optical scanning device according to claim 7, wherein a thickness of the wave-shaped region is smaller than a thickness of the installation region of the bottom.

12. The optical scanning device according to claim 8, further comprising:
- a first lens on which the first light beam deflected by the rotating polygon mirror is incident; and
- a second lens on which the second light beam deflected by the rotating polygon mirror is incident,
- wherein the bottom includes the installation region in which the first lens, the second lens, the rotating polygon mirror, and the driving unit are installed, and
- wherein a width of the wave-shaped region is less than a width of the installation region, in an optical axis direction of the first lens.

13. An image forming apparatus comprising:
- a first photosensitive member;
- a second photosensitive member; and
- an optical scanning device comprising:
  - a light source;
  - a rotating polygon mirror configured to deflect a light beam emitted from the light source;
  - a driving unit including a motor and a driving IC, wherein the motor and the driving IC are configured to drive the rotating polygon mirror to rotate; and
  - an optical box containing the rotating polygon mirror and the driving unit, wherein the optical box includes,
    - an installation region in which the rotating polygon mirror and the driving unit are installed,
    - a first sidewall to which the light source is fixed,
    - a second sidewall provided opposite the first sidewall, relative to the rotating polygon mirror,
    - a bottom to which first and second optical components are attached, wherein the first optical component is configured to guide a first light beam deflected by the rotating polygon mirror to a first photosensitive member, and the second optical component is configured to guide a second light beam deflected by the rotating polygon mirror to a second photosensitive member different from the first photosensitive member and that is provided opposite the first optical component relative to the rotating polygon mirror, and
    - a connection region provided between the first optical component and the second optical component, connecting the second sidewall to the installation region directly, and having a height different from a height of the bottom in a height direction orthogonal to the bottom, and
  - wherein the connection region includes,
    - a first wall provided on the first optical component side, and connecting the bottom to the connection region,
    - a second wall provided on the second optical component side, and connecting the bottom to the connection region, and
    - a wave-shaped region having a wave shape in a cross section that is orthogonal to the connection region without intersecting the first wall and the second wall.

* * * * *